(12) United States Patent
Toizumi et al.

(10) Patent No.: US 11,044,375 B2
(45) Date of Patent: Jun. 22, 2021

(54) MULTIFUNCTIONAL APPARATUS HAVING EXTERNAL RECORDING MEDIUM SLOT

(71) Applicant: SHARP KABUSHIKI KAISHA, Sakai (JP)

(72) Inventors: Kiyoshi Toizumi, Sakai (JP); Tohru Nishikawa, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/789,260

(22) Filed: Feb. 12, 2020

(65) Prior Publication Data

US 2020/0274983 A1 Aug. 27, 2020

(30) Foreign Application Priority Data

Feb. 26, 2019 (JP) .............................. JP2019-033298

(51) Int. Cl.
*H04N 1/00* (2006.01)
*G06F 3/12* (2006.01)

(52) U.S. Cl.
CPC ........... *H04N 1/00965* (2013.01); *G06F 3/12* (2013.01); *H04N 1/00411* (2013.01)

(58) Field of Classification Search
None
See application file for complete search history.

(56) References Cited

U.S. PATENT DOCUMENTS

| | | | | |
|---|---|---|---|---|
| 2007/0243748 A1* | 10/2007 | Kuse | ................. | G03G 21/1652 439/352 |
| 2009/0180144 A1* | 7/2009 | Ito | ........................ | G03G 15/502 358/1.16 |
| 2011/0102327 A1* | 5/2011 | Miki | .................... | H04N 1/2158 345/168 |
| 2013/0141758 A1* | 6/2013 | Yoneda | .............. | G03G 15/5066 358/1.15 |
| 2013/0290576 A1* | 10/2013 | Shigenobu | .............. | G06F 13/10 710/74 |
| 2015/0242026 A1* | 8/2015 | Nakamura | ......... | H04N 1/00411 345/174 |
| 2019/0306340 A1* | 10/2019 | Ishida | ................ | H04N 1/00339 |
| 2020/0288028 A1* | 9/2020 | Hayakawa | ......... | H04N 1/00496 |

FOREIGN PATENT DOCUMENTS

JP 2004-109765 A 4/2004

* cited by examiner

*Primary Examiner* — Henok Shiferaw
(74) *Attorney, Agent, or Firm* — ScienBiziP, P.C.

(57) ABSTRACT

Provided is a multifunctional apparatus including an external recording medium slot at a position higher than a touch area that receives touch operation by a user, and the touch area is provided in an operation panel provided on a near side of a main body of the multifunctional apparatus and near an upper edge of the main body.

4 Claims, 23 Drawing Sheets

MULTIFUNCTIONAL APPARATUS HAVING EXTERNAL RECORDING MEDIUM SLOT

BACKGROUND OF THE INVENTION

Field of the Invention

The present invention relates to a multifunctional apparatus.

Description of the Background Art

A multifunctional apparatus is an apparatus that includes an image reading device, an image forming device, a facsimile transmission and reception device, a storage device, and the like, to perform image reading, image printing, image copying, image transmission, and the like. A certain percentage of multifunctional apparatuses has an external recording medium slot such as a universal serial bus (USB) memory slot. Such a multifunctional apparatus can read an image data file, a document file, and the like from a USB memory inserted in the USB slot, and can also print an image or a document based on them.

Normally, the USB slot is arranged near the operation panel. FIG. 2 of Japanese Unexamined Patent Application Publication No. 4233293 illustrates an example in which the USB slot is arranged immediately adjacent to the right side of the operation panel. For this reason, when operating the operation panel, it is necessary for the user to take care to prevent the arm or hand from hitting the USB slot or the USB memory inserted therein, which is inconvenient. Moreover, if the arm or hand actually hits, there is a possibility that the USB memory or the USB slot may be damaged. Furthermore, since the metal of the USB slot is exposed, it is inconvenient to work so as not to hit the main body, and there is a risk of breakage. Further, since the metal is exposed, if the arm or hand actually hits the USB slot, there is a possibility that the user may be hurt due to static electricity or electric discharge.

It is noted that this problem is true of not only for USB slots but also other types of external recording medium slots such as secure digital (SD) card memory slots, Compact Flash (registered trademark) memory slots, and multimedia memory card slots.

Thus, an object of the present invention is to provide a multifunctional apparatus having a memory card slot that is convenient for the user.

SUMMARY OF THE INVENTION

According to the present invention, there is provided a multifunctional apparatus including an external recording medium slot at a position higher than a touch area that receives touch operation by a user, and the touch area is provided in an operation panel provided on a near side of a main body of the multifunctional apparatus and near an upper edge of the main body.

In addition, according to the present invention, there is provided a multifunctional apparatus including an external recording medium slot at a position higher than an operation panel provided on a near side of a main body of the multifunctional apparatus and near an upper edge of the main body.

Furthermore, according to the present invention, there is provided a multifunctional apparatus including an external recording medium slot at a position on a far side of a touch area that receives touch operation by a user, and the touch area is provided in an operation panel provided on a near side of a main body of the multifunctional apparatus and near an upper edge of the main body.

Furthermore, according to the present invention, there is provided a multifunctional apparatus including an external recording medium slot at a position on a far side of an operation panel provided on a near side of a main body of the multifunctional apparatus and near an upper edge of the main body.

Furthermore, according to the present invention, there is provided a multifunctional apparatus including an external recording medium slot in a protruded part provided in a main body casing of the multifunctional apparatus.

In addition, according to the present invention, there is provided a multifunctional apparatus including an external recording medium slot in a recess provided in a main body casing of the multifunctional apparatus.

According to the present invention, the external recording medium slot becomes more convenient for the user.

DESCRIPTION OF THE PREFERRED EMBODIMENTS

Embodiments for carrying out the present invention will be described in detail with reference to the drawings below.

First Embodiment

Figure 1:
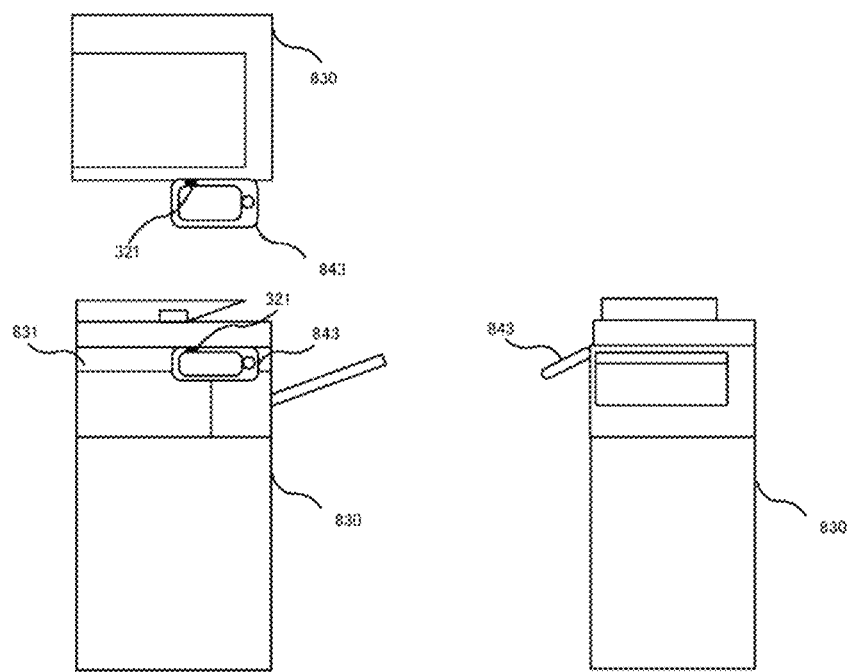
FIG. 1 is a front view, a top view, and a right side view illustrating a configuration of a multifunctional apparatus according to a first embodiment of the present invention.
Figure 2:
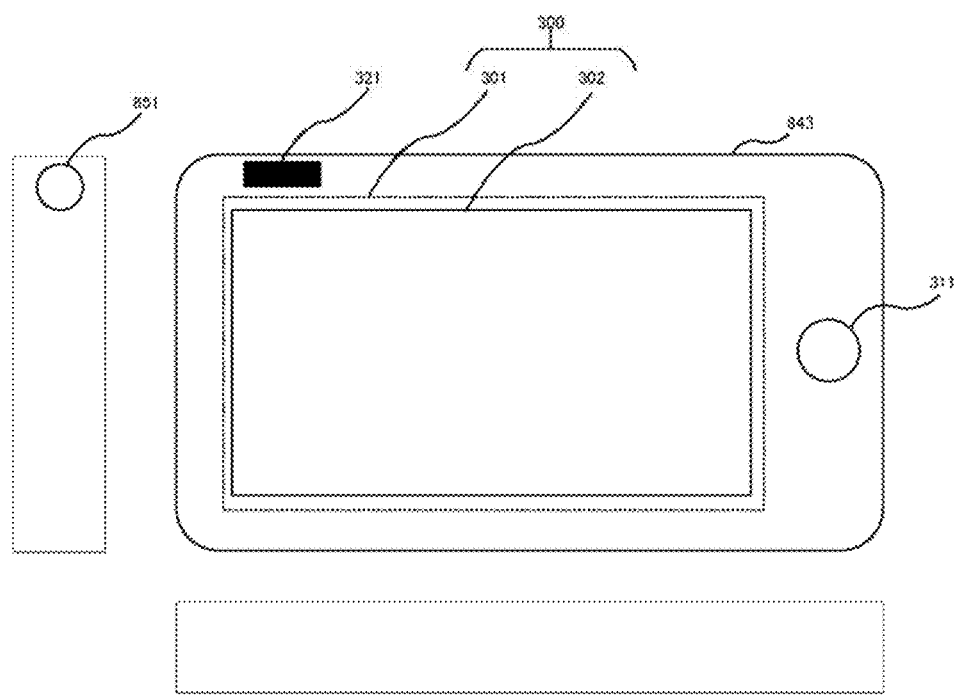
FIG. 2 is a plan view illustrating a configuration of an operation panel of the multifunctional apparatus according to the first embodiment of the present invention.

In a first embodiment, as illustrated in FIG. 1, an operation panel 843 is provided on a top right side of a front face of a main body 830. As illustrated in FIG. 2, a touch panel 300 and an input button 311 are arranged on the operation panel 843. Further, a display area 301 and a touch area 302 are provided in the touch panel 300. In the example of FIG. 2, the touch area 302 is provided in a portion excluding the vicinity of the outer edge of the display area 301. However, the display area 301 and the touch area 302 may be the same, or contrary to the example of FIG. 2, the display area 301 may be provided in a portion excluding the vicinity of the outer edge of the touch area 302. Such a relationship between the display area 301 and the touch area 302 is the same in other embodiments.

Further, as illustrated in FIG. 2, a USB slot 321 is provided at a position above the touch area 302 of the operation panel 843.

Figure 3:
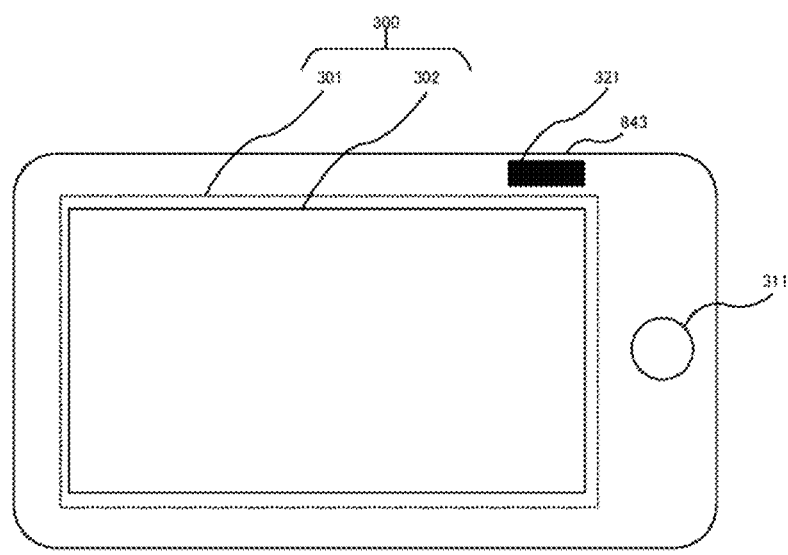
FIG. 3 is a plan view illustrating another configuration of the operation panel of the multifunctional apparatus according to the first embodiment of the present invention.

The position of the USB slot 321 may be above the touch area 302 of the operation panel 843, for example, the position of the USB slot 321 may be as illustrated in FIG. 3.

It is noted that the USB slot 321 may be replaced with another type of memory card slot such as an SD card memory slot, a compact flash memory slot, or a multimedia memory card slot.

In the present embodiment, the USB slot is arranged at a position away from the operation panel in the front face of the multifunctional apparatus, and thus the problem in the known art is solved. Furthermore, since the USB slot is arranged at a position higher than the operation panel, the operability of the user is not impaired as the USB slot is easily seen by the user.

A rotation shaft 851 is provided in the vicinity of the upper edge of the operation panel 843. The operation panel 843 is attached in the vicinity of the upper edge of an upper front panel 831 by being supported by the rotation shaft 851. Therefore, the user can turn the operation panel 843 to face the front, face diagonally upward, or face upward. It is noted that the upper front panel 831 is a panel that occupies a predetermined range from the upper edge part of the front of the main body. As long as the upper front panel 831 occupies the vicinity of the upper edge part, the range thereof may extend downward.

Second Embodiment

Figure 4:
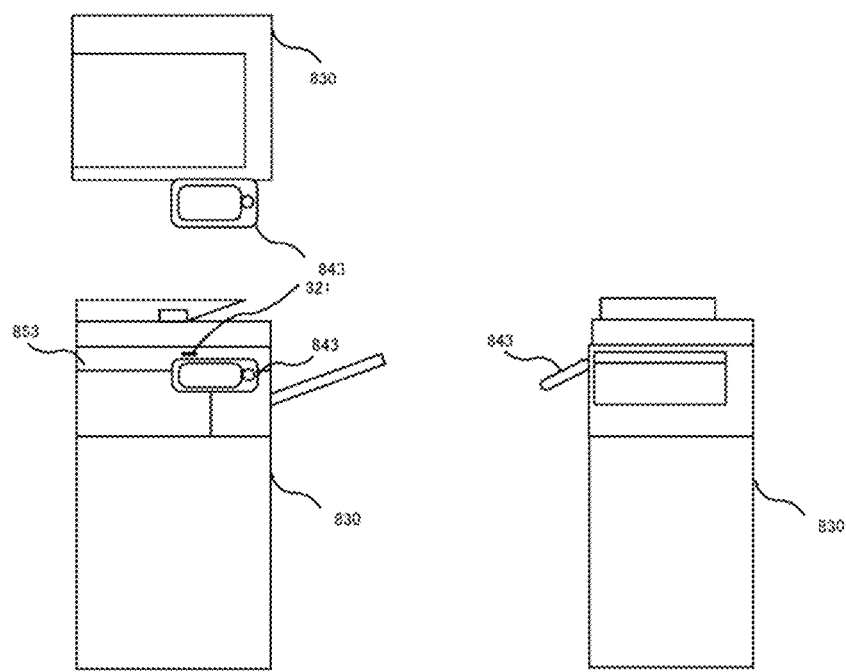
FIG. 4 is a front view, a top view, and a right side view illustrating a configuration of a multifunctional apparatus according to a second embodiment of the present invention.
Figure 5:
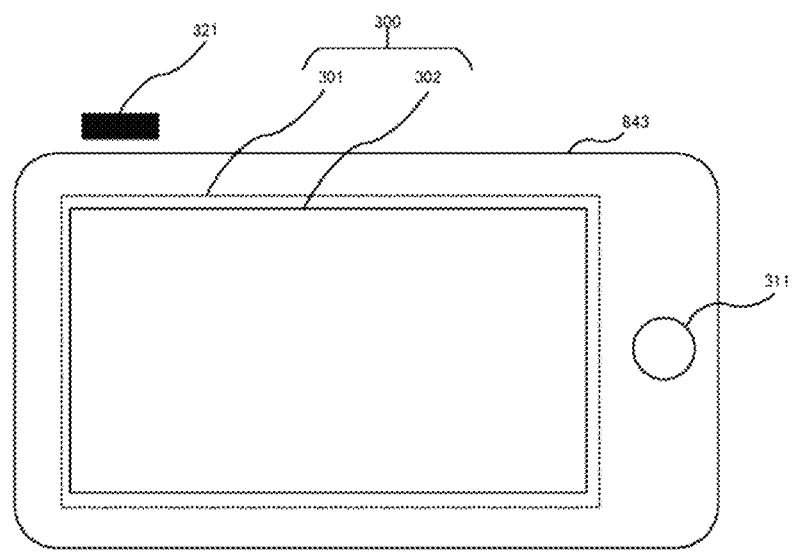
FIG. 5 is a plan view illustrating a configuration near an operation panel of the multifunctional apparatus according to the second embodiment of the present invention.

In a second embodiment, as illustrated in FIG. 4, the operation panel 843 is provided near an upper right side of a front face of the main body 830. Also, as illustrated in FIG. 5, the touch panel 300 and the input button 311 are arranged on the operation panel 843. Further, the display area 301 and the touch area 302 are provided in the touch panel 300.

Further, as illustrated in FIGS. 4 and 5, the USB slot 321 is provided at a position above the operation panel 843.

Figure 6:
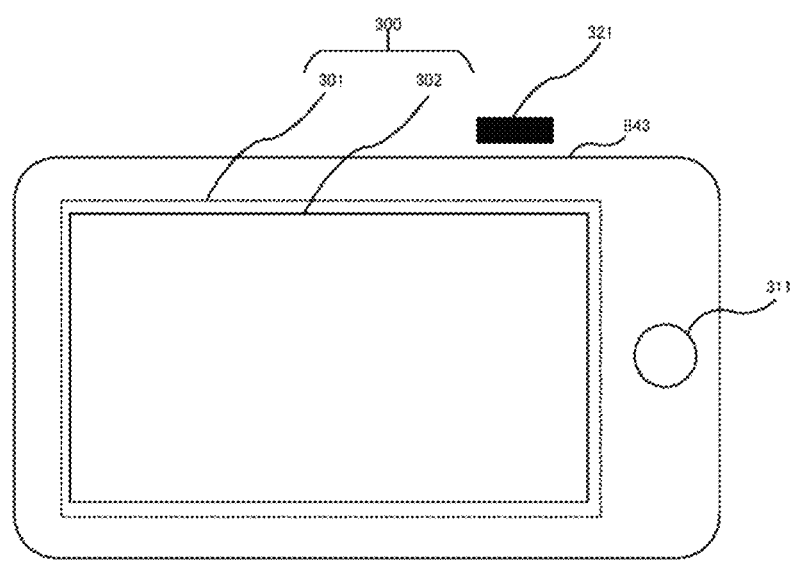
FIG. 6 is a plan view illustrating another configuration near an operation panel of the multifunctional apparatus according to the second embodiment of the present invention.

The position of the USB slot 321 may be above the operation panel 843, for example, the position of the USB slot 321 may be as illustrated in FIG. 6.

Third Embodiment

Figure 7:
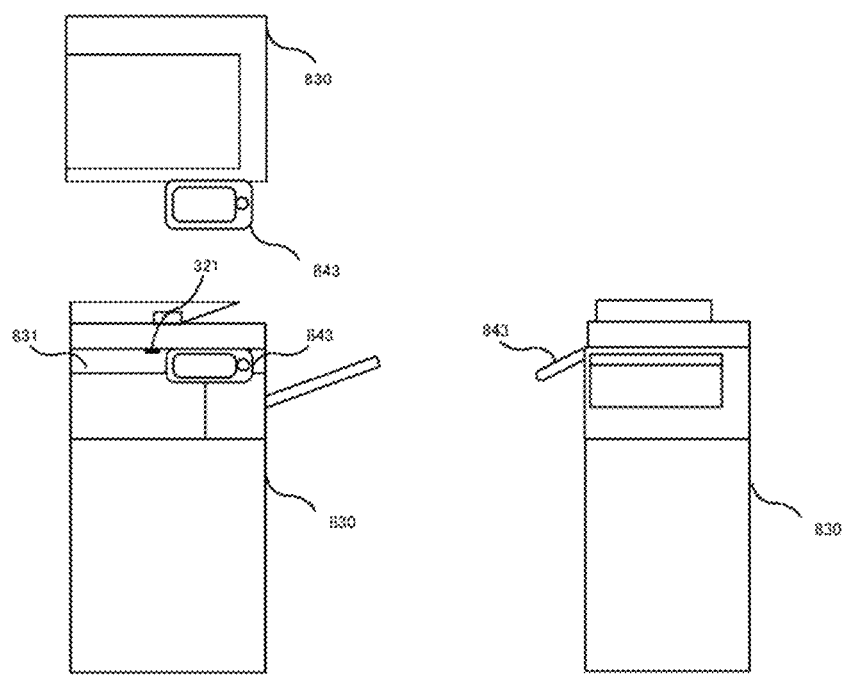
FIG. 7 is a front view, a top view, and a right side view illustrating a configuration of a multifunctional apparatus according to a third embodiment of the present invention.

In a third embodiment, as illustrated in FIG. 7, the operation panel 843 is provided on the top right side of the front face of the main body 830. Further, as illustrated in FIG. 7, the USB slot 321 is disposed at or near the center in a width direction of the upper front panel 831 of the main body 830.

The position of the USB slot 321 is above the touch area 302 of the touch panel 300 provided on the operation panel 843.

Figure 8:
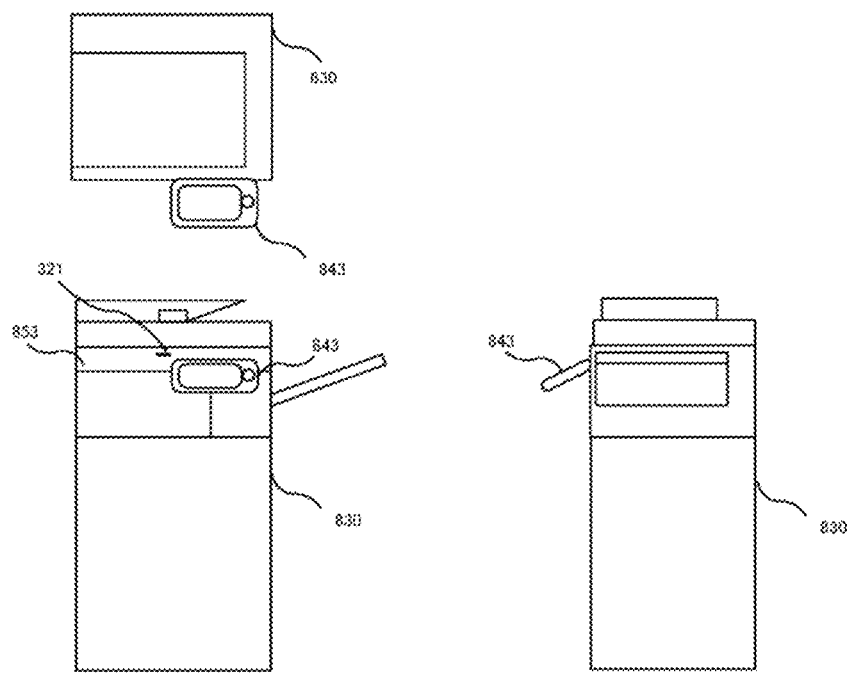
FIG. 8 is a front view, a top view, and a right side view illustrating another configuration of the multifunctional apparatus according to the third embodiment of the present invention.

Further, as illustrated in FIG. 8, similarly to the second embodiment, the position of the operation panel 843 may be slightly shifted downward compared to the first embodiment such that the USB slot 321 is above the operation panel 843. In this case too, the USB slot 321 is disposed at or near the center in a width direction of the upper front panel 831 of the main body 830.

Fourth Embodiment

Figure 9:
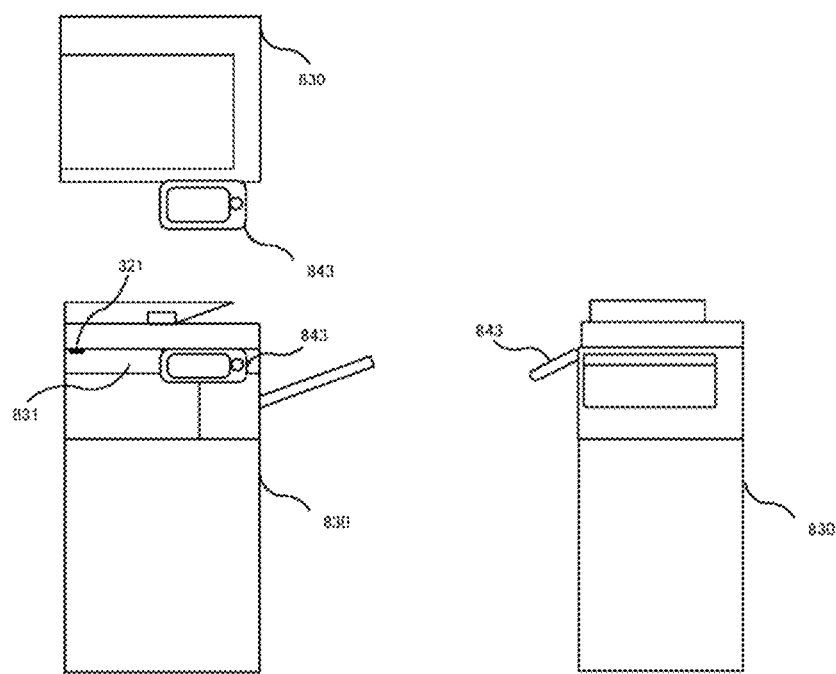
FIG. 9 is a front view, a top view, and a right side view illustrating a configuration of a multifunctional apparatus according to a fourth embodiment of the present invention.

In a fourth embodiment, as illustrated in FIG. 9, the operation panel 843 is provided on a top right side of a front face of the main body 830. Further, as illustrated in FIG. 9, the USB slot 321 is disposed near a left end of the upper front panel 831 of the main body 830.

Figure 10:
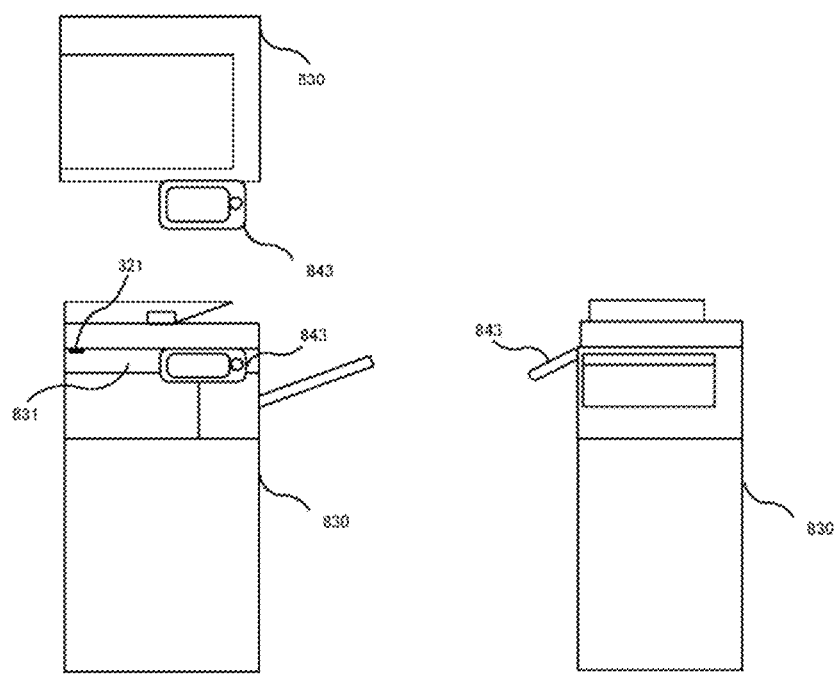
FIG. 10 is a front view, a top view, and a right side view illustrating another configuration of the multifunctional apparatus according to the fourth embodiment of the present invention.

The position of the USB slot 321 may be on the left side of the center of the upper front panel 831 of the main body 830, for example, the position of the USB slot 321 may be as illustrated in FIG. 10.

Figure 11:
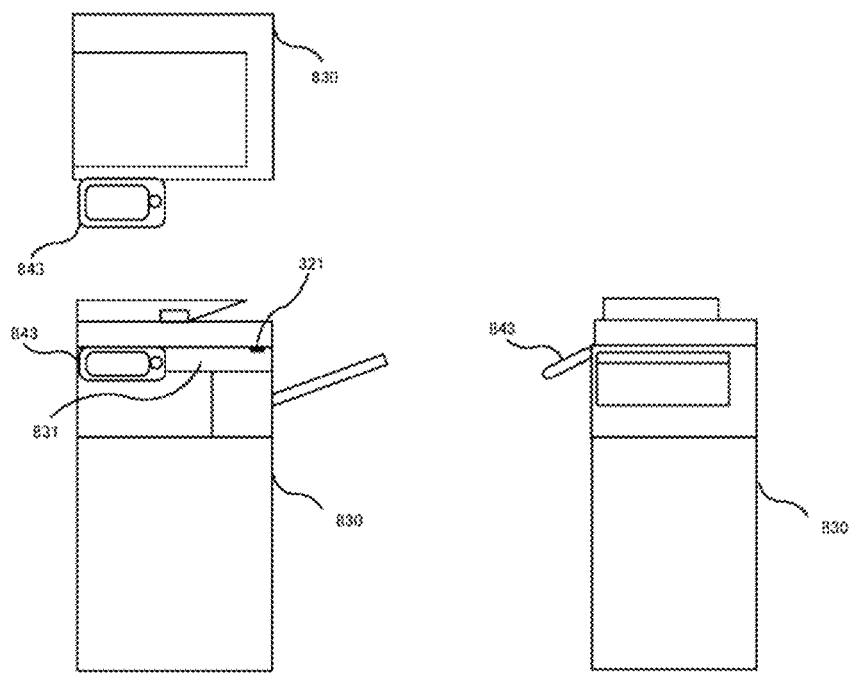
FIG. 11 is a front view, a top view, and a right side view illustrating yet another configuration of the multifunctional apparatus according to the fourth embodiment of the present invention.

As illustrated in FIG. 11, if the operation panel 843 is provided on the top left side of the front face of the main body 830, the position of the USB slot 321 may be on the right side of the center of the upper front panel 831 of the main body 830.

In any of the examples illustrated in FIGS. 9 to 11, the position of the USB slot 321 is above the touch area 302 of the touch panel 300 provided on the operation panel 843.

In the examples illustrated in FIGS. 9 and 10, the operation panel 843 is on the right side if viewed from the front of the main body 830 and the USB slot 321 is on the left side, but there may be no slot other than the USB slot 321 on the left side of the upper front panel 831 of the main body 830. Further, no buttons may be provided.

In the example illustrated in FIG. 11, the operation panel 843 is on the left side if viewed from the front of the main body 830 and the USB slot 321 is on the right side, but there may be no slot other than the USB slot 321 on the right side of the upper front panel 831 of the main body 830. Further, no buttons may be provided.

Although not illustrated in the figure, similarly to the second embodiment, the position of the operation panel 843 may be slightly shifted downward compared to the first embodiment such that the USB slot 321 is above the operation panel 843. In this case too, the USB slot 321 is arranged on the opposite side of the operation panel 843 if viewed in a width direction of the upper front panel 831 of the main body 830.

Fifth Embodiment

Figure 12:
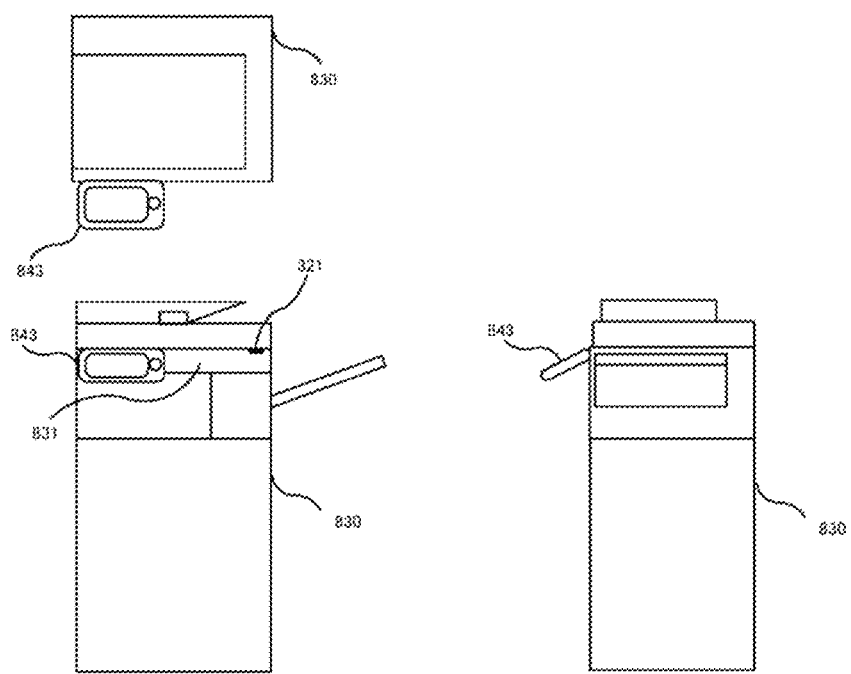
FIG. 12 is a front view, a top view, and a right side view illustrating a configuration of a multifunctional apparatus according to a fifth embodiment of the present invention.

In the fifth embodiment, as illustrated in FIG. 12, if a handle 323 provided in an automatic document feeder single pass feeder (SPF) 824 is viewed as the center in the left-right direction, an operation panel 843 is provided on the right side therefrom, and the USB slot 321 is provided on the left side.

Figure 13:
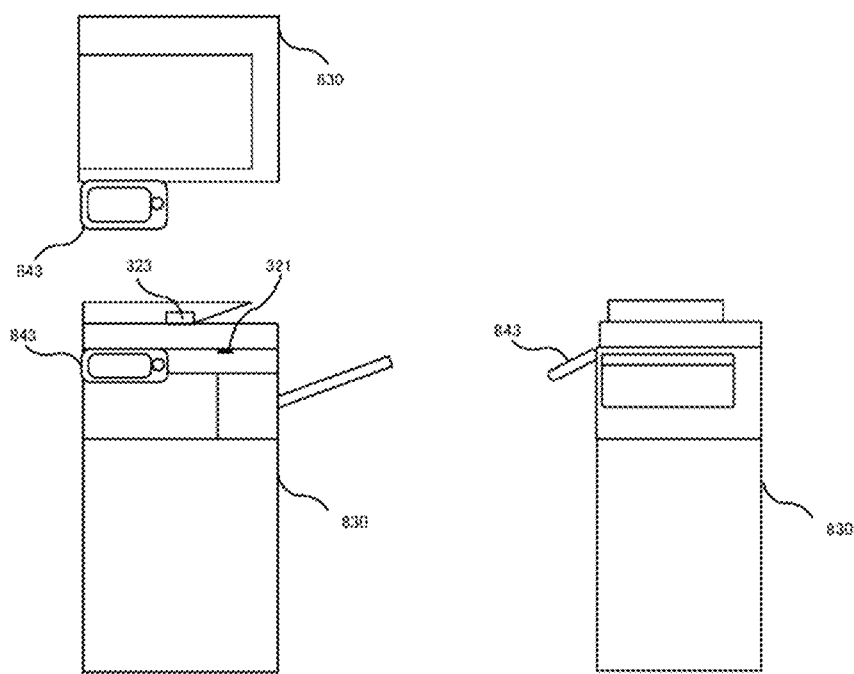
FIG. 13 is a front view, a top view, and a right side view illustrating another configuration of the multifunctional apparatus according to the fifth embodiment of the present invention.

As illustrated in FIG. 13, if the handle 323 provided in the automatic document feeder SPF 824 is viewed as the center in the left-right direction, the operation panel 843 may be provided on the left side therefrom, and the USB slot 321 may be provided on the right side.

It is noted that in any of the examples illustrated in FIG. 12, the position of the USB slot 321 is above the touch area 302 of the touch panel 300 provided on the operation panel 843.

Further, although not illustrated in the figure, similarly to the second embodiment, the position of the operation panel 843 may be slightly shifted downward compared to the first embodiment such that the USB slot 321 is above the operation panel 843. In this case too, if the handle 323 provided in the automatic document feeder SPF 824 is viewed as the center in the left-right direction, the operation panel 843 is provided on the right side therefrom, and the USB slot 321 is provided on the left side. If the handle 323 provided in the automatic document feeder SPF 824 is viewed as the center in the left-right direction, the operation panel 843 may be provided on the left side therefrom, and the USB slot 321 may be provided on the right side.

Sixth Embodiment

Figure 14:
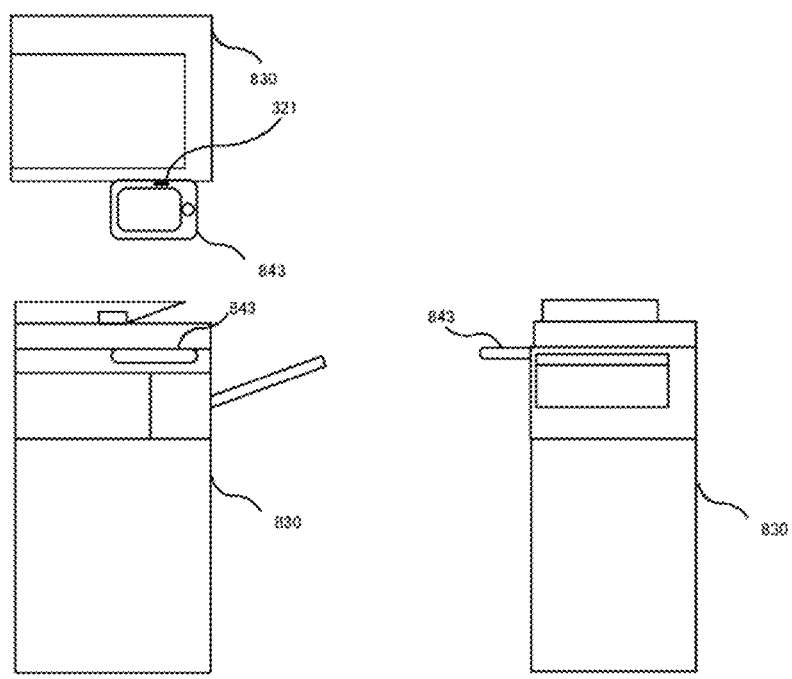
FIG. 14 is a front view, a top view, and a right side view illustrating a configuration of a multifunctional apparatus according to a sixth embodiment of the present invention.

In a sixth embodiment, the operation panel 843 faces upward. In the first embodiment, since the operation panel 843 faces diagonally upward, the USB slot 321 provided in the operation panel 843 as illustrated in FIG. 2 exists above and on the far side of the touch area 302, but in the sixth embodiment, since the operation panel 843 faces upward, the USB slot 321 provided in the operation panel 843 as illustrated in FIG. 14 exists, in relation to the touch area 302, in the same horizontal direction and at a position on the far side.

Seventh Embodiment

Figure 15:
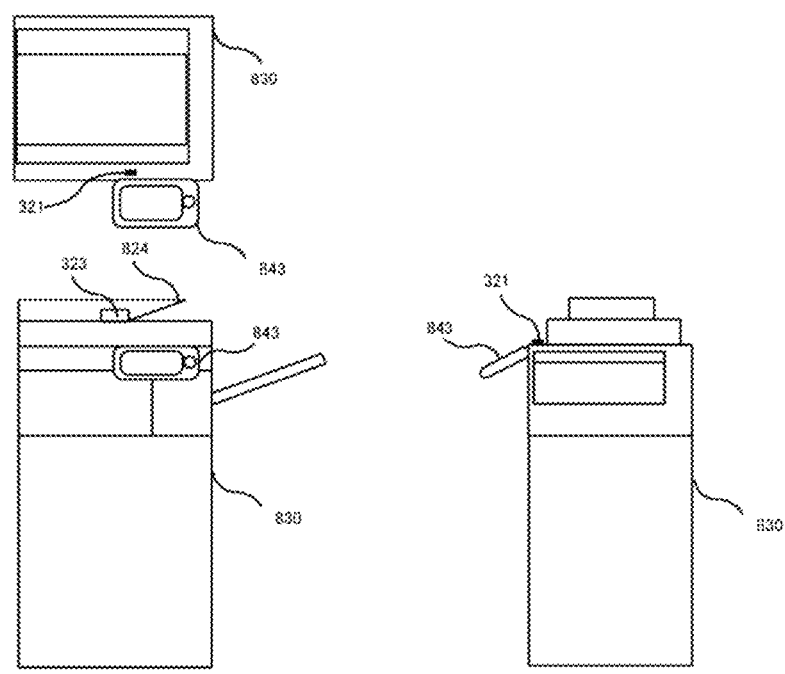
FIG. 15 is a front view, a top view, and a right side view illustrating a configuration of a multifunctional apparatus according to a seventh embodiment of the present invention.

In a seventh embodiment, as illustrated in FIG. 15, the USB slot 321 is provided, in the main body, on the far side of the operation panel 843.

In the seventh embodiment, unlike the fourth embodiment, it is not necessary to provide the USB slot 321 on the opposite side of the operation panel 843 with respect to the center of the main body 830. That is, in the seventh embodiment, the USB slot 321 may be provided on the side same as the operation panel 843 with respect to the center of the main body 830.

However, although not illustrated in the figure, the USB slot 321 may be provided on the opposite side of the operation panel 843 with respect to the center of the main body 830.

Also, in the seventh embodiment, unlike the fifth embodiment, if the handle 323 provided in the automatic document feeder SPF 824 is viewed as the center in the left-right direction, it is not necessary to provide the USB slot 321 on the opposite side of the operation panel 843. That is, in the seventh embodiment, if the handle 323 provided in the automatic document feeder SPF 824 is viewed as the center in the left-right direction, the USB slot 321 may be provided on the side same as the operation panel 843.

However, although not illustrated in the figure, if the handle 323 provided in the automatic document feeder SPF 824 is viewed as the center in the left-right direction, the USB slot 321 may be provided on the opposite side of the operation panel 843.

Eighth Embodiment

Figure 16:
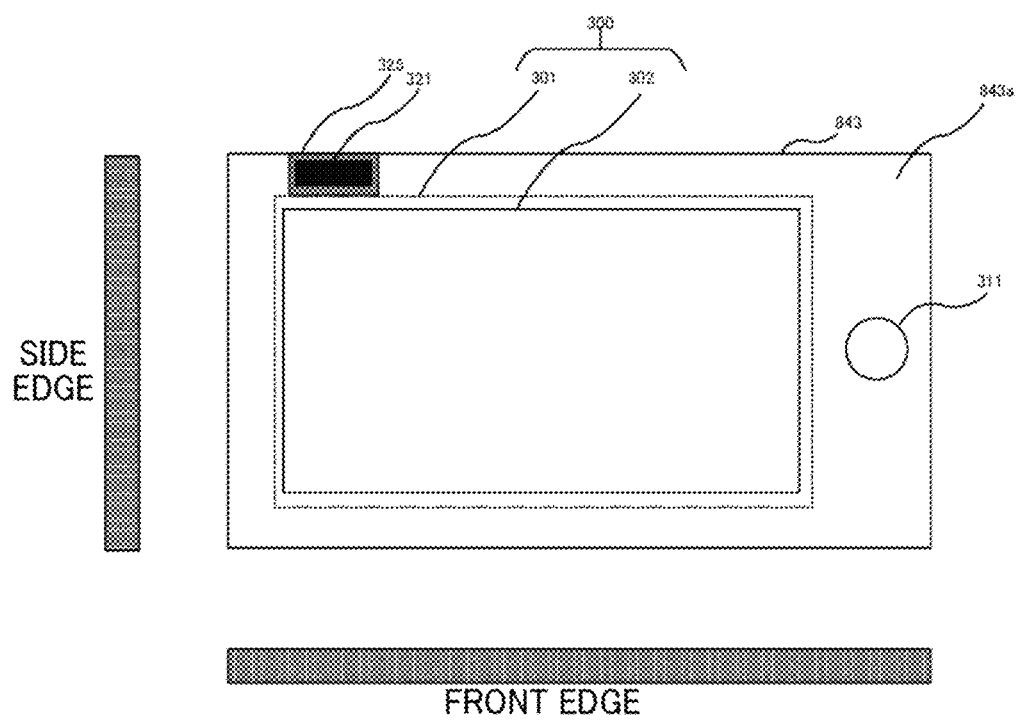
FIG. 16 a front view, a left side view, and a plan view, as well as a schematic view of the vicinity of a USB slot illustrating a configuration of an operation panel of a multifunctional apparatus according to an eighth embodiment of the present invention.

An eighth embodiment is any one of the first to seventh embodiments in which the color of a peripheral part 325 of the USB slot 321 is the same as the color of the front edge and the side edge of the operation panel 843, as illustrated in FIG. 16.

In this case, it is preferable to make the color of the front edge and the side edge different from the color of an operation surface 843a of the operation panel 843 excluding the touch panel 300. In this case, the color of the peripheral part 325 of the USB slot 321 is different from the color of the operation surface 843a of the operation panel 843.

Ninth Embodiment

Figure 17:
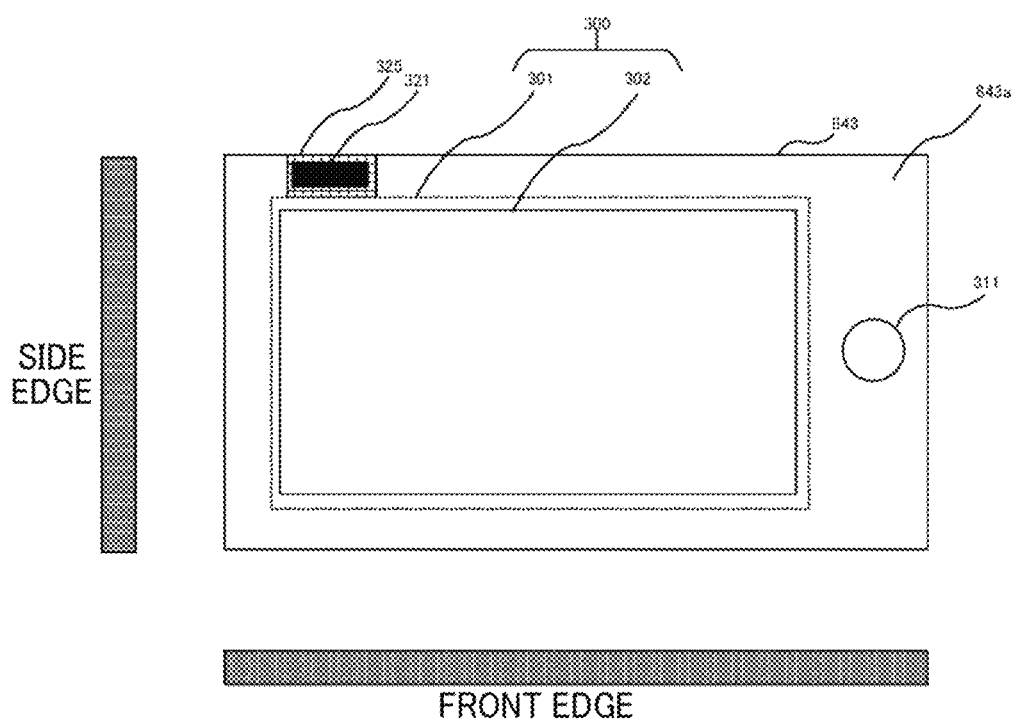
FIG. 17 a front view, a left side view, and a plan view, as well as a schematic view of the vicinity of another USB slot illustrating another configuration of an operation panel of a multifunctional apparatus according to a ninth embodiment of the present invention.

A ninth embodiment is any one of the first to seventh embodiments in which the color of the peripheral part 325 of the USB slot 321 is different from the color of the front edge and the side edge of the operation panel 843, as illustrated in FIG. 17.

In this case, it is preferable that the color of the peripheral part 325 of the USB slot 321 is also different from the color of the operation surface of the operation panel 843 excluding the touch panel 300.

Tenth Embodiment

In a tenth embodiment, the USB slot 321 has an opening facing upward.

Figure 18:
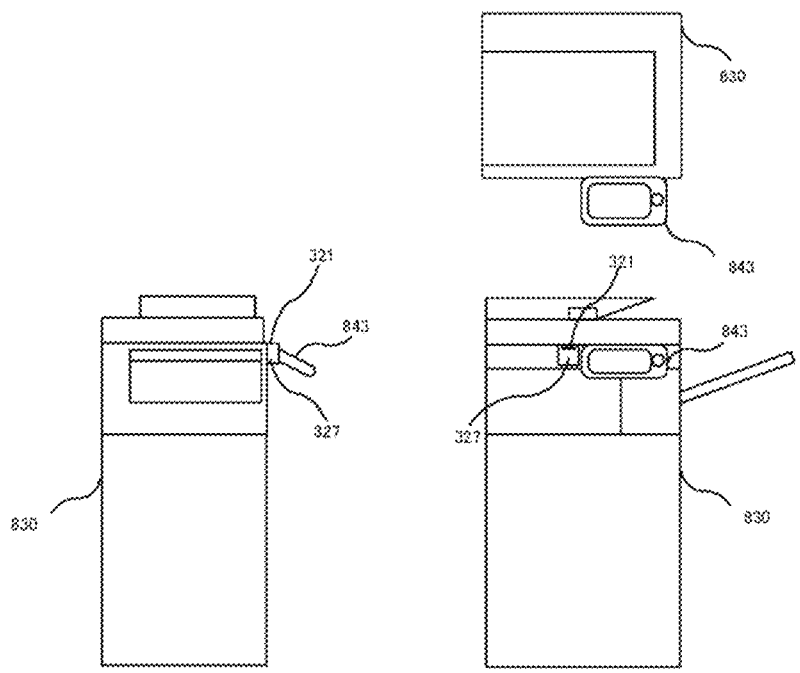
FIG. 18 is a front view, a top view, and a left side view illustrating a configuration of a multifunctional apparatus according to a tenth embodiment of the present invention.

For example, in the seventh embodiment illustrated in FIG. 8, the USB slot 321 has an opening facing forward, but in the tenth embodiment, as illustrated in FIG. 18, the USB slot 321 has the opening facing upward.

For this purpose, for example, as illustrated in FIG. 18, a USB storage 327 into which a USB memory can be inserted vertically is provided.

It is noted that as illustrated in FIG. 18, the USB slot 321 is above the touch area 302 of the touch panel 300.

Figure 19:
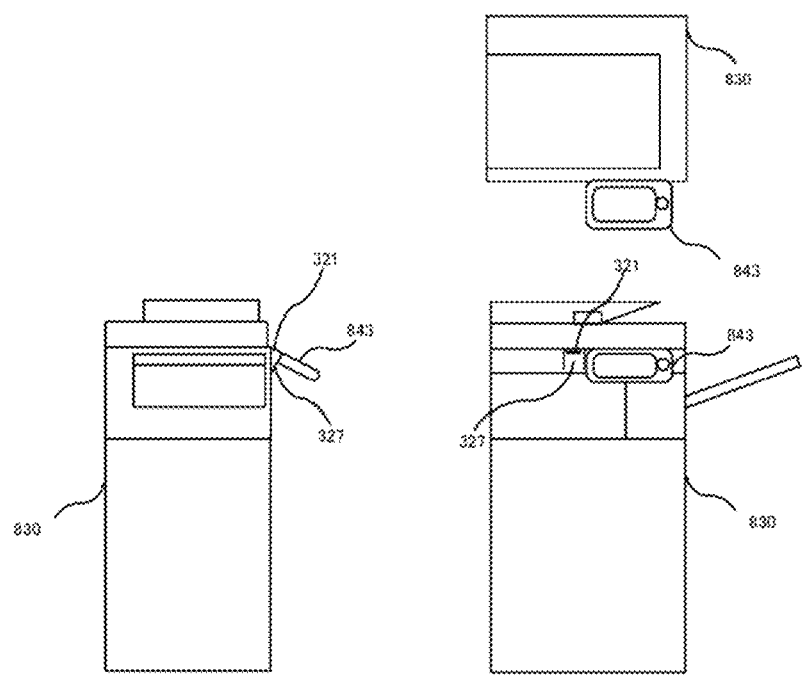
FIG. 19 is a front view, a top view, and a left side view illustrating another configuration of the multifunctional apparatus according to the tenth embodiment of the present invention.

In the example illustrated in FIG. 18, the USB storage 327 extends in the vertical direction and the USB slot 321 faces straight upward, but as illustrated in FIG. 19, the USB storage 327 may extend, in a diagonal direction, from the far and lower side toward the near and upper side of the main body, in a side view of the main body, and the USB slot 321 may face diagonally upward so that the opening can be seen from the front side.

Eleventh Embodiment

Figure 20:
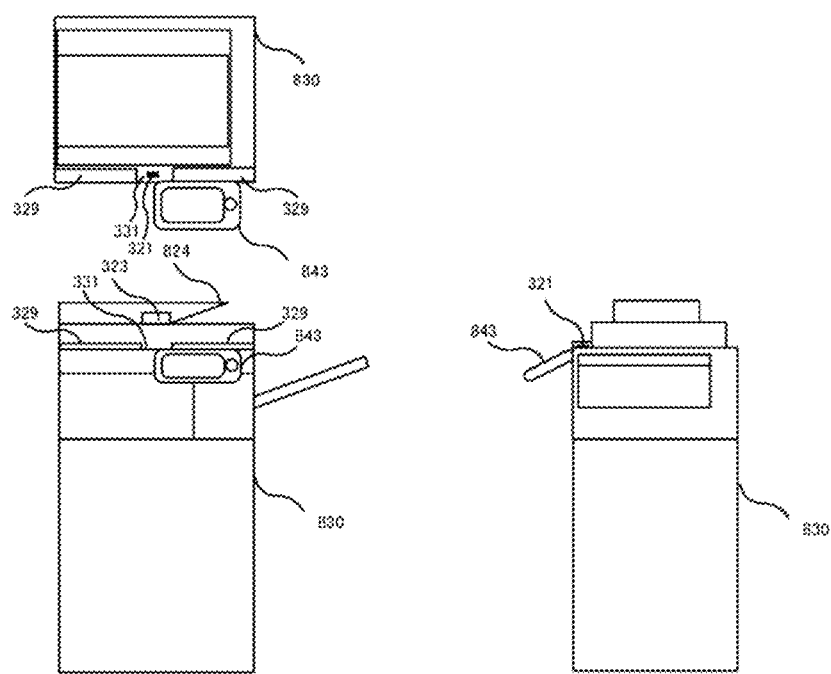
FIG. 20 is a front view, a top view, and a right side view illustrating a configuration of a multifunctional apparatus according to an eleventh embodiment of the present invention.

In an eleventh embodiment, as illustrated in FIG. 20, the upper surface of the main body 830 is provided with two protruded parts 329 and one recess 331 sandwiched therebetween.

The USB slot 321 is provided in the recess 331.

Twelfth Embodiment

Figure 21:
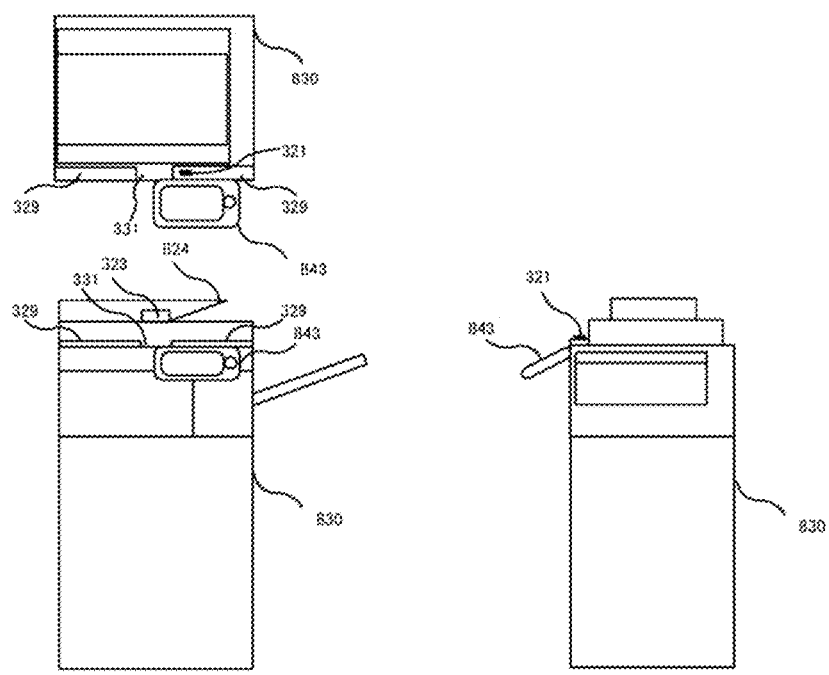
FIG. 21 is a front view, a top view, and a right side view illustrating a configuration of a multifunctional apparatus according to a twelfth embodiment of the present invention.

In a twelfth embodiment, as illustrated in FIG. 21, the upper surface of the main body 830 is provided with the two protruded parts 329 and the one recess 331 sandwiched therebetween.

The USB slot 321 is provided in the protruded part 329.

Thirteenth Embodiment

Figure 22:
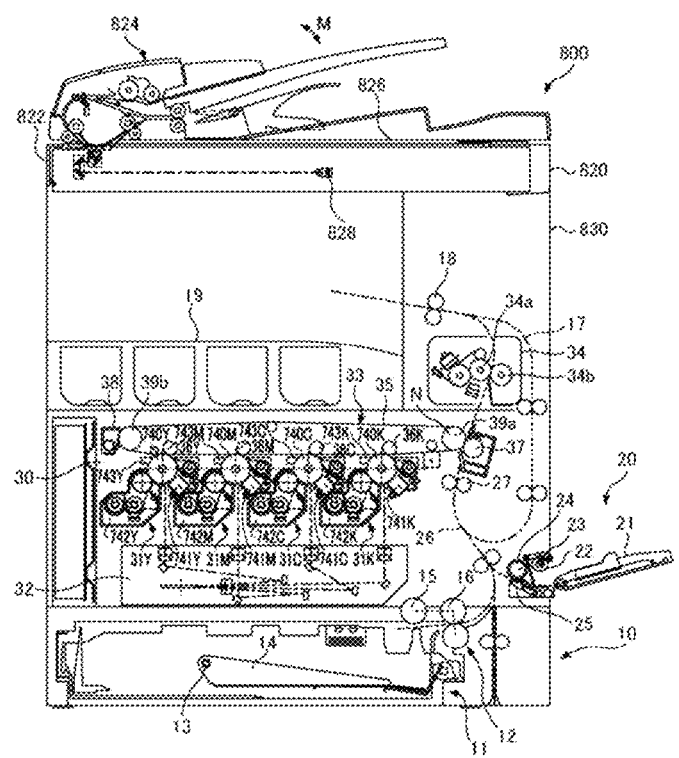
FIG. 22 is a conceptual cross-sectional view of a multifunctional apparatus according to a thirteenth embodiment of the present invention.
Figure 23:
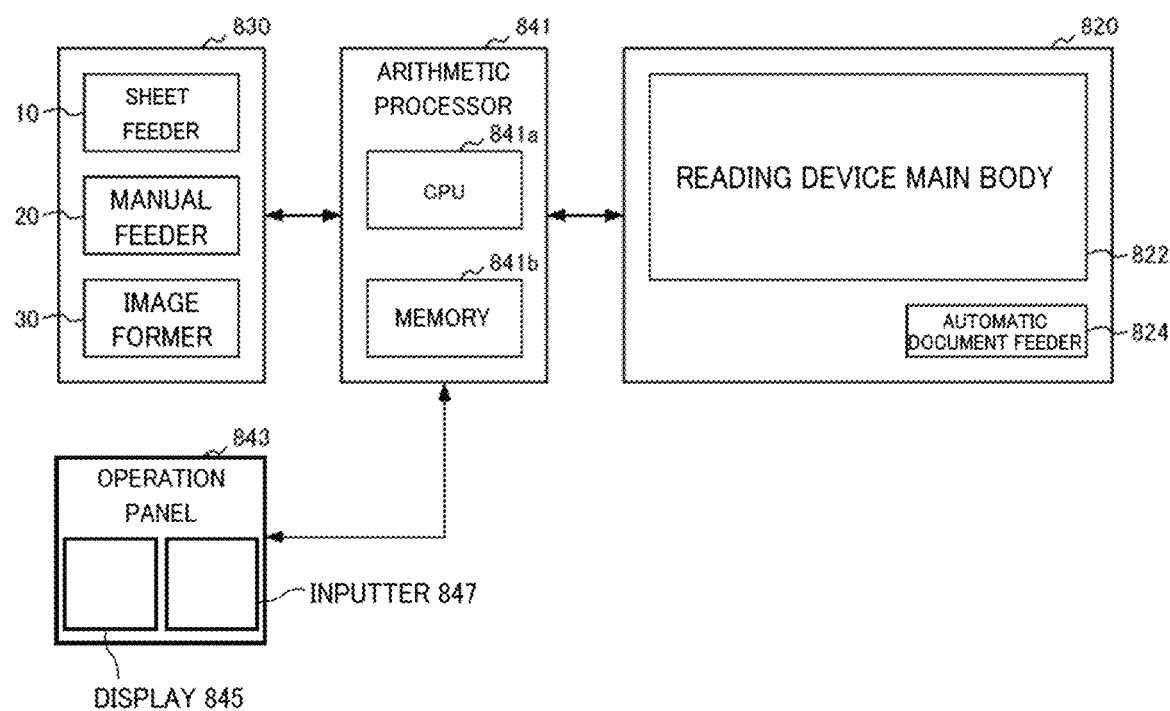
FIG. 23 is a functional block diagram of a multifunctional apparatus according to the thirteenth embodiment of the present invention.

A thirteenth embodiment relates to a multifunctional apparatus 800 including a document reading device according to the first to the twelfth embodiments. FIGS. 22 and 23 illustrate the configurations of the multifunctional apparatus 800.

As illustrated in FIGS. 22 and 23, the multifunctional apparatus 800 includes a document reading device 820 that reads an image of a document, a multifunctional apparatus main body (image former main body) 830 that forms an image on a sheet, the operation panel 843 for operating the document reading device 820 and the multifunctional apparatus main body 830, and an arithmetic processor 841 that controls the document reading device 820 and the multifunctional apparatus main body 830 based on an operation through the operation panel 843.

In addition to using the document reading device 820 alone for reading an image and using the multifunctional apparatus main body 830 alone for forming an image, the document reading device 820 and the multifunctional apparatus main body 830 can also be linked to copy an image. The multifunctional apparatus 800 may include a storage device and a facsimile device (not illustrated). The storage device can store an image read by the document reading device 820 and an image received by the facsimile device. The facsimile device can transmit an image read by the document reading device 820 and an image stored in the storage device, and can receive an image from the outside. Furthermore, the multifunctional apparatus 800 may include an interface for connecting to a personal computer via a network. The personal computer connected to the multifunctional apparatus 800 can use the function of the multifunctional apparatus for data to be managed.

The document reading device 820 includes the automatic document feeder SPF 824 that automatically feeds a document, and a reading device main body 822 that reads an image of the document. It is noted that in addition to the components illustrated in FIG. 23, the document reading device 820 also includes components illustrated in FIG. 22 but not illustrated in FIG. 23. Further, as illustrated in FIG. 22, the reading device main body 822 includes a platen 826.

The multifunctional apparatus main body 830 includes a sheet feeder 10 that feeds sheets, a manual feeder 20 that manually feeds sheets, and an image former 30 that forms an image on a sheet fed by the sheet feeder 10 or the manual feeder 20.

The sheet feeder 10 includes a sheet stacking part 11 in which sheets are stacked and a separation feeder 12 that separates and feeds the sheets stacked on the sheet stacking part 11 one by one. The sheet stacking part 11 includes an intermediate plate 14 that turns about a rotation shaft 13. The intermediate plate 14 turns to lift a sheet upward when the sheet is fed. The separation feeder 12 includes a pickup roller 15 that feeds a sheet lifted by the intermediate plate 14 and a pair of separation rollers 16 that separates the sheet fed by the pickup roller 15 one by one.

The manual feeder 20 includes a manual feed tray 21 on which sheets are stackable and a separation feeder 22 that separates and feeds the sheets stacked on the manual feed tray 21 one by one. The manual feed tray 21 is turnably supported by the multifunctional apparatus main body 830, and can be fixed at a predetermined angle so that sheets can be stacked if a sheet is manually fed. The separation feeder 22 includes a pickup roller 23 that feeds sheets stacked on the manual feed tray 21, and a separation roller 24 and a separation pad 25 that separate the sheets fed by the pickup roller 23 one by one.

The image former 30 includes four process cartridges 31Y to 31K that form yellow (Y), magenta (M), cyan (C), and black (K) images, respectively, photoreceptor drums 740Y to 740K, which will be described below, an exposure device 32 that exposes the surfaces of the photoreceptor drums, a transferer 33 that transfers toner images formed on the surfaces of the photoreceptor drums 740Y to 740K onto a sheet, and a fixer 34 that fixes the transferred toner images onto the sheet. It is noted that the alphabets (Y, M, C, and K) appended to the end of the reference numerals indicate the respective colors (yellow, magenta, cyan, and black).

Each of the four process cartridges 31Y to 31K is removable from the multifunctional apparatus main body 830 to be replaceable. It is noted that since the four process cartridges 31Y to 31K have the same configuration except that the color of the image to be formed is different, only the configuration of the process cartridge 31Y that forms a yellow (Y) image will be described, and the explanation of the process cartridges 31M to 31K is omitted accordingly.

The process cartridge 31Y includes the photoreceptor drum 740Y serving as an image carrier, a charger 741Y that charges the photoreceptor drum 740Y, a developing device 742Y that develops an electrostatic latent image formed on the photoreceptor drum 740Y, and a drum cleaner 743Y that removes toner remaining on the surface of the photoreceptor drum 740Y. The developing device 742Y includes a developing device main body (not illustrated in detail) that develops the photoreceptor drum 740Y, and a toner cartridge (not illustrated in detail) that supplies toner to the developing device main body. The toner cartridge is attachable to and detachable from the developing device main body, and can be removed from the developing device main body and replaced if the stored toner runs out.

The exposure device 32 includes a light source (not illustrated) that emits laser light, a plurality of mirrors (not illustrated) that guide the laser light to the photoreceptor drums 740Y to 740K, and the like. The transferer 33 includes an intermediate transfer belt 35 that carries toner images formed on the photoreceptor drums 740Y to 740K, primary transfer rollers 36Y to 36K that primarily transfer the toner images formed on the photoreceptor drums 740Y to 740K onto the intermediate transfer belt 35, a secondary transfer roller 37 that secondarily transfers the toner images transferred onto the intermediate transfer belt 35 onto a sheet, and a belt cleaner 38 that removes toner remaining on the intermediate transfer belt 35. The intermediate transfer belt 35 is wound around a driving roller 39a and a driven roller 39b, and is pressed against the photoreceptor drums 740Y to 740K by the primary transfer rollers 36Y to 36K. The secondary transfer roller 37 and the driving roller 39a nip (sandwich) the intermediate transfer belt 35. The secondary transfer roller 37 transfers the toner image carried by the intermediate transfer belt 35 onto a sheet at a nip zone N. The fixer 34 includes a heating roller 34a that heats the sheet, and a pressure roller 34b in press contact with the heating roller 34a.

The operation panel 843 includes a display 845 that displays predetermined information, and an inputter 847 that allows a user to input instructions to the document reading device 820 and the multifunctional apparatus main body 830. In the present embodiment, the operation panel 843 is arranged on the front side of the reading device main body 822. It is noted that the front side corresponds to the front side of the drawing sheet of FIG. 22, and the rear side corresponds to the back side of the drawing sheet of FIG. 22.

The display 845 includes the display area 301 of the touch panel 300. Further, the display 845 may include another display area.

The inputter 847 includes the touch area 302 of the touch panel 300. Further, the inputter 847 may include an input button and the like.

As illustrated in FIG. 23, the arithmetic processor 841 includes a CPU 841a that drives and controls the sheet feeder 10, the manual feeder 20, the image former 30, and the document reading device 820, and a memory 841b that stores various programs for operating the CPU 841a, various information used by the CPU 841a, and the like. The arithmetic processor 841 integrally controls the operations of the sheet feeder 10, the manual feeder 20, the image former 30, and the document reading device 820 based on an operation on the operation panel 843 by the user, to form an image on a sheet.

Next, an image forming operation (image forming control by the arithmetic processor 841) performed by the multifunctional apparatus 800 configured as described above will be described. In the present embodiment, an example of image forming operation will be described in which the image former 30 forms an image of a document fed by the automatic document feeder 824 and then read by the reading device main body 822 on a sheet fed by the sheet feeder 10.

When an image formation start signal is transmitted in response to a user input to the inputter 847 of the operation panel 843, a document to be read which is placed on the automatic document feeder 824 by the user is automatically fed toward a document reading position, and the image is read at the document reading position by the reading device main body 822.

Once the image of the document is read by the reading device main body 822, the exposure device 32 emits, to the photoreceptor drums 740Y to 740K, their respective laser beams, based on the image information of the read document. At this time, the photoreceptor drums 740Y to 740K have been already charged by the chargers 741Y to 741K, respectively, and the laser beams each emitted to one of the photoreceptor drums 740Y to 740K form electrostatic latent images on the photoreceptor drums 740Y to 740K, respectively. Thereafter, the electrostatic latent images formed on the photoreceptor drums 740Y to 740K are developed by the developing devices 742Y to 742K to form yellow (Y), magenta (M), cyan (C), and black (K) toner images on the respective photoreceptor drums 740Y to 740K. The toner images of the respective colors formed on the photoreceptor drums 740Y to 740K are superimposed and transferred onto the intermediate transfer belt 35 by the primary transfer rollers 36Y to 36K, and the superimposed and transferred toner image (full color toner image) is conveyed to the nip zone N while being carried on the intermediate transfer belt 35.

In parallel with the image forming operation described above, the sheets stacked on the sheet stacking part 11 are fed to a sheet conveyance path 26 by the pickup roller 15 while being separated by the separation feeder 12 one by one. Then, the skew of the sheet is corrected by a pair of registration rollers 27 upstream of the nip zone N in the sheet conveyance direction, and the sheet is conveyed to the nip zone N at a predetermined conveyance timing. Onto the sheet conveyed to the nip zone N, the full color toner image carried by the intermediate transfer belt 35 is transferred by the secondary transfer roller 37.

The sheet onto which the toner image has been transferred is heated and pressed by the fixer 34, thereby the toner image is fused and fixed, and the sheet is discharged out of the apparatus by a pair of discharge rollers 18. The sheet discharged from the apparatus is stacked on a discharge sheet stacking part 19.

It is noted that if images are formed on both sides (a first side and a second side) of a sheet, the pair of discharge rollers 18 is reversely rotated to convey the sheet to a double-sided conveyance path 17 before the sheet of which the first side is formed with an image is discharged from the apparatus, and then, the sheet is conveyed to the image former 30 via the double-sided conveyance path 17 again. Next, similarly to the first side, an image is formed on the second side and the sheet is discharged from the apparatus. The sheet discharged from the apparatus is stacked on the discharge sheet stacking part 19.

The present invention can be implemented in various other forms without departing from the spirit or main features thereof. Therefore, the embodiments described above are only examples, and should not be interpreted limitedly. The scope of the present invention is indicated by the claims, and is not restricted by the description of the specification. Further, all modifications and changes belonging to a scope equivalent to the claims are included within the scope of the present invention.

INDUSTRIAL APPLICABILITY

The present invention can be employed in a multifunctional apparatus. Further, the present invention can be employed in a device having a USB slot.

DESCRIPTION OF REFERENCE NUMERALS

300 Touch panel
301 Display area

302 Touch area
321 USB slot
843 Operation panel

What is claimed is:

1. A multifunctional apparatus, comprising an external recording medium slot at a position higher than a touch area that receives touch operation by a user, the touch area being provided in an operation panel provided on a near side of a main body of the multifunctional apparatus and near an upper edge of the main body, wherein:
   the external recording medium slot is in an upper front panel of the main body, and
   the external recording medium slot is provided on a side opposite in a left-right direction to a side on which the operation panel is attached with reference to a position of a handle of an automatic sheet feeding device when the main body is viewed from the front.

2. The multifunctional apparatus according to claim 1, wherein a slot and an operation button other than the external recording medium slot are not provided on the side opposite in the left-right direction to the side on which the operation panel is attached with reference to the position of the handle of the automatic sheet feeding device when the main body is viewed from the front.

3. The multifunctional apparatus according to claim 1, wherein:
   the external recording medium slot is provided on the side opposite in the left-right direction to the side on which the operation panel is attached when the main body is viewed from the front, and
   a slot and an operation button other than the external recording medium slot are not provided on the side opposite in the left-right direction to the side on which the operation panel is attached when the main body is viewed from the front.

4. The multifunctional apparatus according to claim 1, wherein the operation panel is a touch panel.

* * * * *